(12) United States Patent
Wei et al.

(10) Patent No.: US 8,708,237 B2
(45) Date of Patent: Apr. 29, 2014

(54) ENCODING AND DECODING METHOD FOR MICRODOT MATRIX

(75) Inventors: Shou-Te Wei, Hsin-Chu (TW); Chia-Lin Wang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 849 days.

(21) Appl. No.: 12/371,907

(22) Filed: Feb. 16, 2009

(65) Prior Publication Data

US 2009/0224054 A1   Sep. 10, 2009

Related U.S. Application Data

(60) Provisional application No. 61/034,157, filed on Mar. 6, 2008.

(51) Int. Cl.
*G06K 7/10* (2006.01)
(52) U.S. Cl.
USPC .......................................... 235/470; 235/494
(58) Field of Classification Search
USPC ........................................ 235/470, 462, 494
See application file for complete search history.

(56) References Cited

U.S. PATENT DOCUMENTS

| 2004/0035935 | A1* | 2/2004 | Takahashi et al. ....... 235/462.09 |
| 2006/0143203 | A1 | 6/2006 | Kanev |
| 2007/0023523 | A1 | 2/2007 | Onishi |
| 2010/0215281 | A1* | 8/2010 | Kanev et al. .................. 382/225 |

FOREIGN PATENT DOCUMENTS

JP   200160878   3/2001

* cited by examiner

*Primary Examiner* — Michael G Lee
*Assistant Examiner* — Tabitha Chedekel
(74) *Attorney, Agent, or Firm* — Winston Hsu; Scott Margo

(57) ABSTRACT

In a data region of each microdot block on a microdot matrix, a coordinate of each the microdot block on the microdot matrix is encoded into a plurality of microdots included by the data region according to an encoding method based on Reflected Gray codes. With the aid of a unique changed bit between any two consecutive Reflected Gray codes, an estimated coordinate of a frame, which is fetched by scanning the microdot matrix, on the microdot matrix, may still be decoded even if no complete microdot block is fetched within the frame.

21 Claims, 9 Drawing Sheets

$G_0$ 0000
$G_1$ 0001  Even to Odd Reflected Gray Code => Change the least significant bit
$G_2$ 0011  Odd to Even Reflected Gray Code
    => Change the next-to-left bit of the rightmost bit 1
$G_3$ 0010  Even to Odd Reflected Gray Code => Change the least significant bit
$G_4$ 0110  Odd to Even Reflected Gray Code
    => Change the next-to-left bit of the rightmost bit 1
$G_5$ 0111  Even to Odd Reflected Gray Code => Change the least significant bit
$G_6$ 0101  Odd to Even Reflected Gray Code
    => Change the next-to-left bit of the rightmost bit 1
$G_7$ 0100  Even to Odd Reflected Gray Code =>Change the least significant bit
$G_8$ 1100  Odd to Even Reflected Gray Code
    => Change the next-to-left bit of the rightmost bit 1
$G_9$ 1101  Even to Odd Reflected Gray Code => Change the least significant bit
$G_{10}$ 1111  Odd to Even Reflected Gray Code
    => Change the next-to-left bit of the rightmost bit 1
$G_{11}$ 1110  Even to Odd Reflected Gray Code => Change the least significant bit
$G_{12}$ 1010  Odd to Even Reflected Gray Code
    => Change the next-to-left bit of the rightmost bit 1
$G_{13}$ 1011  Even to Odd Reflected Gray Code => Change the least significant bit
$G_{14}$ 1001  Odd to Even Reflected Gray Code
    => Change the next-to-left bit of the rightmost bit 1
$G_{15}$ 1000  Even to Odd Reflected Gray Code => Change the least significant bit

FIG. 2

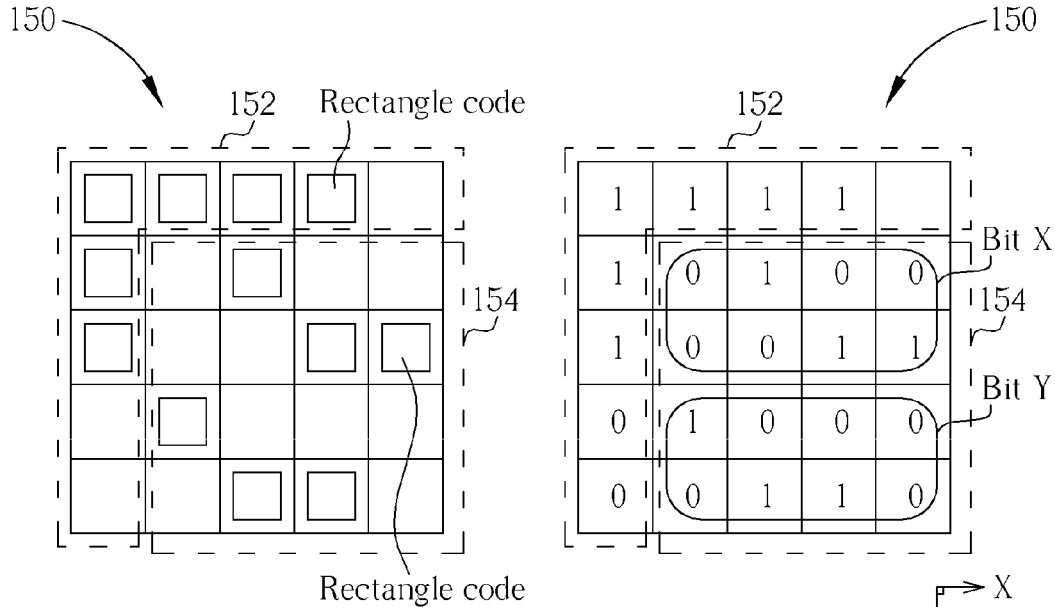

Encode a first coordinate and a second coordinate respectively by encoding based on Reflected Gray Code, and respectively plot the encoded first coordinate and second coordinate onto a first microdot region and a second microdot region of a data region according to a first direction, a second direction, and a coordinate of each the microdot block on the microdot matrix

FIG. 12

ENCODING AND DECODING METHOD FOR MICRODOT MATRIX

CROSS REFERENCE TO RELATED APPLICATIONS

This application is a non-provisional application of U.S. Provisional Application No. 61/034,157, filed on Mar. 6, 2008, the contents of which are incorporated herein by reference.

BACKGROUND OF THE INVENTION

1. Field of the Invention

The present invention discloses an encoding and decoding method, and more particularly, to an encoding and decoding method for a microdot matrix.

2. Description of the Prior Art

Please refer to FIG. 1, which is a diagram of a frame 102 generated by scanning a microdot matrix, where the microdot matrix includes a plurality of microdot blocks 120 arranged as a matrix, and the frame covers at least four complete microdot blocks 120. Note that each one of the four complete microdot blocks 120 is neighboring or next to other two of said four complete microdot blocks 120. As shown in FIG. 1, each microdot block 120 includes a plurality of microdots 160, and is segmented into a header region 122 and a data region 124. The header region 122 of each the microdot block 120 includes a plurality of microdots 160 distributed in a same combination and a same permutation for recognizing the plurality of covered microdot blocks 120 in the frame 102. The data region 124 of each the microdot block 120 includes a plurality of microdots 160 distributed with different combinations and permutations for indicating an encoded coordinate of each said microdot block 120 on the microdot matrix, where the encoded coordinate of each said microdot block 120 is the reason why the different combinations and permutations of the plurality of microdots 160 of different microdot blocks 120 are required. In other words, after recognizing the plurality of microdot blocks 120 covered by the frame 102, the coordinate of each the microdot block 120 on the microdot matrix may be decoded according to the plurality of microdots 160 of the data region 122 of each said microdot block 120.

The prior art mentioned in FIG. 1 may be used under a condition, under which a handheld optical scanning device is used for scanning a displaying medium plotted with the microdot matrix, for recognizing locations and movements of the optical scanning device moving on the microdot matrix. However, whether the prior art mentioned in FIG. 1 can work well is highly restricted by resolution of the optical scanning device or the microdot matrix. As can be observed from FIG. 1, the frame 102 has to cover at least one complete microdot block 120 so as to decode an effective coordinate for recognizing a corresponding location of the frame 102 on the microdot matrix. However, if a resolution of the optical scanning device or the microdot matrix is over-high so that the frame 102 is not large enough to cover at least one complete microdot block 120, any coordinate corresponding to the frame 102 can not be decoded because of lack of required information; at this time, the prior art mentioned in FIG. 1 is not available in locating the frame 102. Moreover, orientations of the frame 102 and each the microdot block 120 covered by the frame 102 are usually inconsistent with each other, that is, there may be an included angle, which is larger than 0 degree and less than 180 degree, between a first two-dimensional axis for the frame 102 and a second two-dimensional axis for each the microdot block 120 covered by the frame 102. Note that in FIG. 1, two-dimensional axes of the frame 102 and each the microdot block 120 covered by the frame 102 are consistent with each other. If the frame 102 shown in FIG. 1 is rotated with an angle, which is larger than 0 degree and less than 180 degree, the coordinate corresponding to the frame 102 can not be decoded as well because any complete microdot block 120 is not fetched in the frame 102. Low cost and high resolution are always primary aims in researching a conventional optical scanning device or a microdot matrix implemented with smaller arrays. Therefore, for solving the abovementioned defects so as to meet the requirement that at least one complete microdot block 120 is scanned in the frame 102, reducing resolution should not be an effective solution.

SUMMARY OF THE INVENTION

The claimed invention discloses an encoding method for a microdot matrix. The encoding method comprises plotting a plurality of microdots on a data region by encoding based on Reflected Gray Codes. The data region is comprised by each microdot block of a microdot matrix.

The claimed invention discloses a decoding method of a microdot matrix. The decoding method comprises decoding an estimated coordinate on a microdot matrix and corresponding to a frame according to both partial region of a data region of each microdot block and encoding based on Reflected Gray Codes. The frame is generated by scanning the microdot matrix. The partial region of the data region is recognized according to the frame.

The claimed invention discloses an encoding and decoding method for a microdot matrix. The encoding and decoding method comprises plotting a plurality of microdots on a data region, which is comprised by each microdot block of a microdot matrix, by encoding based on Reflected Gray Codes; and decoding a coordinate on a microdot matrix and corresponding to a frame, which is generated by scanning the microdot matrix, according to partial region, which is recognized according to the frame, of a data region of each the microdot block and the encoding based on Reflected Gray Codes.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a simplified diagram for illustrating basic properties of Reflected Gray Code used in the present invention, as preparations of explaining the disclosed method of the present invention in detail.

FIG. 3 is a diagram of representing a plurality of microdots included in a microdot block, which is the same with the microdot blocks shown in FIG. 1, by binary bits according to a preferred embodiment of the present invention.

FIG. 12 is a flowchart of the encoding method of the present invention.

DETAILED DESCRIPTION

Figure 1:
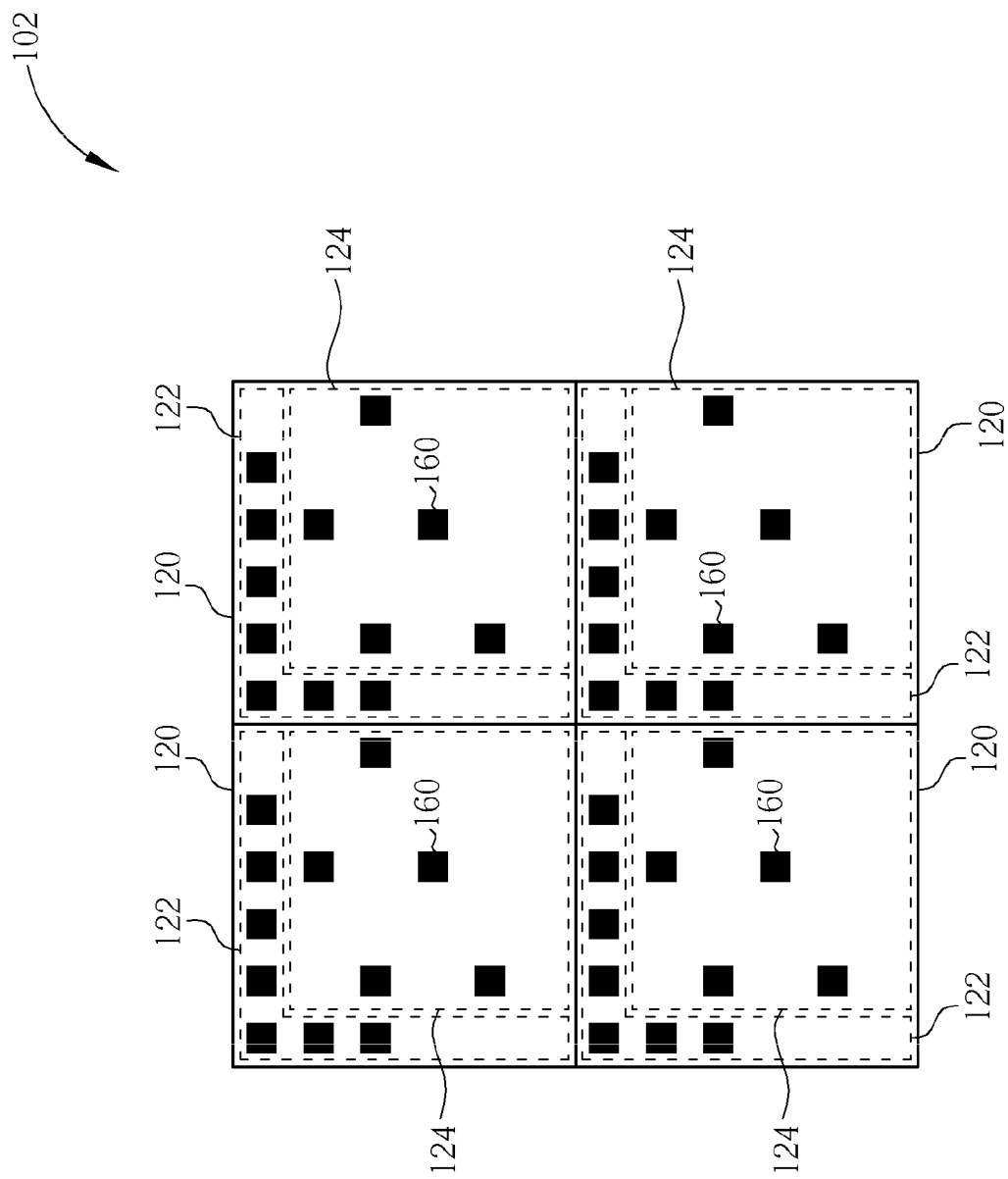
FIG. 1 is a diagram of a frame generated by scanning a microdot matrix, where the microdot matrix includes a plurality of microdot blocks arranged as a matrix, and the frame covers at least four complete microdot blocks.

For solving the defect that any complete microdot block on a microdot matrix can not be scanned in a frame in the prior art so that a corresponding coordinate of the frame on the microdot matrix can not be decoded, an encoding and decoding method for the microdot matrix is disclosed in the present invention. In the disclosed method of the present invention, combination and permutation of microdots included by a data region are based on Reflected Gray Code so as to encode a coordinate of a microdot block, which includes the data region, on the microdot matrix. After implementing the encoding and decoding method of the present invention on the microdot matrix, while scanning the frame on the microdot matrix, even if no complete microdot block is scanned, a relation between neighboring microdot blocks may still be used for inducting the coordinate corresponding to the scanned frame on the microdot matrix.

Please refer to FIG. 2, which is a simplified diagram for illustrating basic properties of Reflected Gray Code used in the present invention, as preparations of explaining the disclosed method of the present invention in detail. Basic properties of Reflected Gray Code include: (1) There is merely one different bit between any two Reflected Gray Codes corresponding to two consecutive integer values, i.e., a Hamming distance between both the Reflected Gray Code is 1, where one of the Reflected Gray Codes must be an odd Reflected Gray Code, and the other one must be an even Reflected Gray Code, since the consecutive integers must indicate a combination of an odd integer and an even integer; (2) While incrementing a value of an even Reflected Gray Code by 1 to generate an odd Reflected Gray Code having the incremented value, merely a next-to-left bit to a rightmost bit 1 in the even Reflected Gray Code is required to be changed to generated said odd Reflected Gray Code; and (3) While incrementing a value of an odd Reflected Gray Code by 1 to generate an even Reflected Gray Code having the incremented value, merely a least significant bit in the odd Reflected Gray code is required to be changed to generate the even Reflected Gray Code. Note that an odd Reflected Gray Code includes an odd number of bits 1, whereas an even Reflected Gray Code includes an even number of bits 1. For example, the Reflected Gray Codes $G_2$, $G_3$, and $G_4$ may be inducted according to binary forms of the integers 2, 3, and 4 respectively. While inducting a value of the Reflected Gray Code $G_3$ according to the value '0011' of the Reflected Gray Code $G_2$, a least significant bit in the value '0011' will be changed so as to generate a value '0010', which is just the value of the Reflected Gray Code $G_3$. While inducting a value of the Reflected Gray Code $G_4$ according to the value '0010' of the Reflected Gray Code $G_3$, a next-to-left bit of the rightmost bit 1 in the value '0010', i.e., the italic bit 0 in the value '0010', is changed so as to generate the value '0110', which is just the value of the Reflected Gray Code $G_4$. Note that the changed bit or a different bit between consecutive Reflected Gray Codes is marked in italic for highlighting. Note that in FIG. 2, for highlighting the reflective properties in Reflected Gray Codes, illustrated Reflected Gray Codes are classified into different sets with horizontal lines, each of which acts as a virtual mirror for any two symmetric Reflected Gray Codes, where both the symmetric Reflected Gray Codes merely differ in the leftmost bit 1 of one of said symmetric Reflected Gray Codes. For example, as can be observed in the value '0011' of the Reflected Gray Code $G_2$ and the value '0111' of the Reflected Gray Code $G_5$, the Reflected Gray Codes $G_2$ and $G_5$ merely differ in the leftmost bit 1 of the Reflected Gray Code $G_5$ and a corresponding bit 0 of the Reflected Gray Code $G_2$, and take the horizontal line between the Reflected Gray Codes $G_3$ and $G_4$ as a virtual mirror. Similarly, the same property may also be observed between Reflected codes $G_3$ and $G_4$, between Reflected codes $G_1$ and $G_6$, or between Reflected codes $G_0$ and $G_7$. Note that the virtual mirror should be known for those who skilled in related art of Reflected Gray Code so that related details are not described for brevity. Moreover, FIG. 3 merely serves as a foundation of explaining the application of Reflected Gray Code in the disclosed method of the present invention.

Primary characteristics of the encoding and decoding method of the present invention lie in a combination of Reflected Gray Code shown in FIG. 2 and specific combinations and permutations of microdots. As can be observed in descriptions related to FIG. 2, a regular pattern lies in any two consecutive Reflected Gray Codes so that the consecutive Reflected Gray Codes may be inducted according to each other. Any two neighboring microdot blocks must have consecutive coordinates in either the X axis or the Y axis; therefore, encoding based on Reflected Gray Code is appropriate in being applied on any two neighboring microdot blocks.

Please refer to FIG. 3, which is a diagram of representing a plurality of microdots included in a microdot block 150, which is the same with the microdot blocks 120 shown in FIG. 1, by binary bits according to a preferred embodiment of the present invention. As shown in the left microdot block 150 shown in FIG. 3, the microdot block 150 is segmented into a header region 152 and a data region 154, each of which includes a plurality of rectangle codes respectively. As a correspondence to the left microdot block 150 shown in FIG. 3, in the right microdot block 150 shown in FIG. 3, grid dots having the rectangle codes are replaced with bits 1, whereas grid dots not having the rectangle codes are replaced with bits 0. In a microdot matrix including a plurality of microdot blocks 150, permutation of bits or rectangle codes in the header region 152 of each the microdot block 150 is the same, whereas permutation of bits or rectangle codes in the data region 154 of each the microdot block 150 is different for indicating different coordinates of the microdot blocks 150 located on the microdot matrix. As shown in FIG. 3, a region BitX indicates an eight-bit X-coordinate '01000011' according to Reflected Gray Code, and a region BitY indicates an eight-bit Y-coordinate '10000110' according to Reflected Gray Code, where both the eight-bit coordinates are browsed left-to-right and up-to-bottom on the microdot block 150, i.e., along incremental directions of both the X axis and the Y axis. However, note that the browse mean described above merely indicates certain embodiments of the present invention, and in other words, in still other embodiments of the present invention, other browse means may still be used. Therefore, other embodiments generated by using obvious combinations and permutations in browsing the coordinates shown in FIG. 3 should not be limitations to the present invention. For clear descriptions, means of browsing the coordinates are described according to as shown in FIG. 3 hereafter. Note that the rectangle codes used above are merely exemplary for explaining distribution of microdots within the microdot block 150, and therefore, replacing the rectangle codes with microdots having other forms, such as triangle codes or circle codes, should not be limitations to the present invention.

Figure 4:
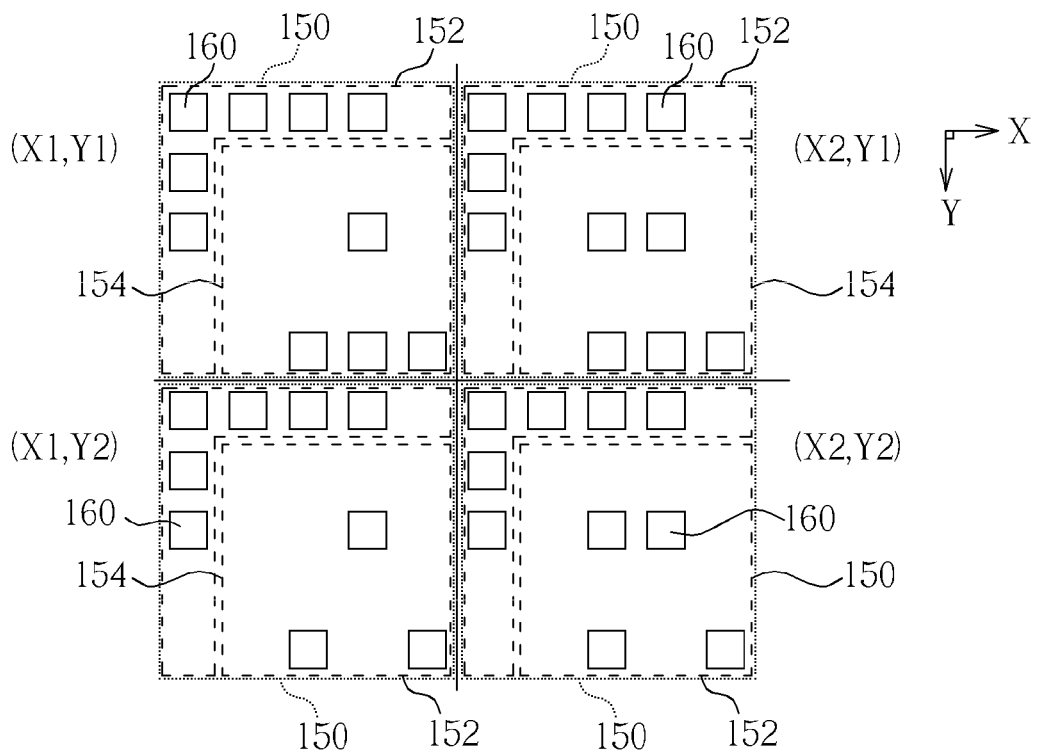
FIG. 4 illustrates encoding used for a plurality of microdot blocks shown in FIG. 3 in a same microdot matrix.

Please refer to FIG. 4, which illustrates encoding used for a plurality of microdot blocks 150 shown in FIG. 3 in a same microdot matrix. Note that when the microdot matrix is fetched with a certain optical scanning apparatus, such as a camera, four microdot blocks 150 shown in FIG. 3 are assumed to be scanned and fetched completely. As shown in FIG. 4, a plurality of rectangle codes 160 is distributed within each microdot block 150 by following the browse mean related to the left microdot block 150 shown in FIG. 3. For example, in each the microdot block 150 shown in FIG. 4, each header region 152 includes a same number of rectangle codes 160, which is arranged in a same combination and permutation, where the plurality of rectangle codes 160 included by the header region 152 is arranged in a L-shape. Note that lines, which are orthogonal and cross to each other, are merely used for indicating the four segmented microdot blocks 150, and are indicated with dotted lines hereafter.

Figure 5:
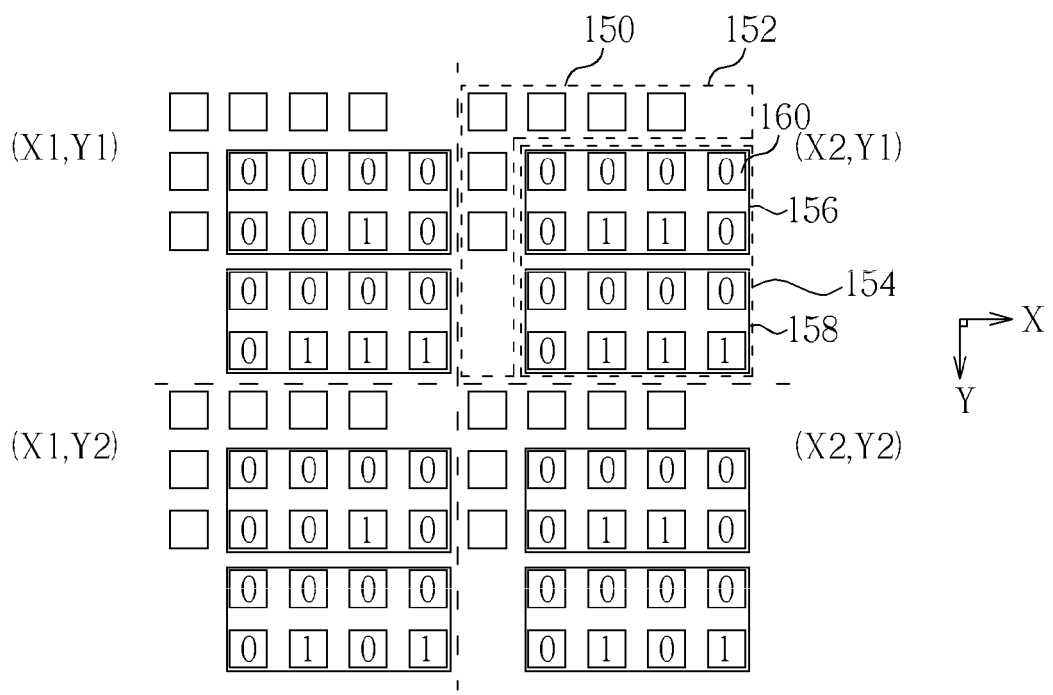
FIG. 5 illustrates encoding of the plurality of microdot blocks shown in FIG. 4.

Please refer to FIG. 5, which illustrates encoding of the plurality of microdot blocks 150 shown in FIG. 4. As mentioned before, in the microdot block 150, grid dots having rectangle codes are indicated with bits 1, whereas grid dots not having rectangle codes are indicated with bits 0. Each the data region 154 is segmented into an X-coordinate region 156 and a Y-coordinate region 158. For example, in the microdot block 150 located at a coordinate (X2, Y1) and a northeast corner in FIG. 5, the X-coordinate X2 is encoded according to a coordinate value '00000110' indicated by the X-coordinate region 156, and the Y-coordinate Y1 is encoded according to a coordinate value '00000111' indicated by the Y-coordinate region 158. In the microdot block 150 located at a coordinate (X1, Y1) and a northwest corner in FIG. 5, the X-coordinate X2 is encoded according to the coordinate value '00000110' indicated by the X-coordinate region 156, and the Y-coordinate Y1 is encoded according to the coordinate value '00000111' indicated by the Y-coordinate region 158. In the microdot block 150 located at a coordinate (X2, Y2) and a southeast corner in FIG. 5, the X-coordinate X2 is encoded according to a coordinate value '00000110' indicated by the X-coordinate region 156, and the Y-coordinate Y2 is encoded according to a coordinate value '00000101' indicated by the Y-coordinate region 158. In the microdot block 150 located at a coordinate (X1, Y2) and a southwest corner in FIG. 5, the X-coordinate X1 is encoded according to a coordinate value '00000010' indicated by the X-coordinate region 156, and the Y-coordinate Y2 is encoded according to a coordinate value '00000101' indicated by the Y-coordinate region 158. Note that a decimal value of the X-coordinate X2 is larger than a decimal value of the X-coordinate X1 by 1, therefore, there is merely one different bit between the Reflected Gray Code '00000010' of the X-coordinate X2 and the Reflected Gray Code '00000110' of the X-coordinate X1, where the different bit is marked in a italic form. Similarly, a decimal value of the Y-coordinate Y2 is larger than a decimal value of the Y-coordinate Y1 by 1, therefore, there is merely one different bit between the Reflected Gray Code '00000111' of the Y-coordinate Y1 and the Reflected Gray Code '00000101' of the Y-coordinate Y2, where the different bit is marked in a italic form.

In the encoding and decoding method disclosed in the present invention, each time when the microdot matrix is scanned, part of four microdot blocks 150, which are as shown in FIG. 4, are supposed to be scanned and fetched as a frame; at this time, both a X-coordinate and a Y-coordinate of a geometric center point on the frame are decoded simultaneously, where the decoded coordinate of the center point, which indicates a combination of the decoded X-coordinate and Y-coordinate, must be the same with a coordinate of one of the four scanned microdot blocks 150. Therefore, a closest position of the frame on the microdot matrix may be determined. Note that the coordinate of the center point is regarded as a coordinate of the frame on the microdot matrix; however, in other embodiments of the present invention, locations other than the center point may also be referred to the coordinate of the frame on the microdot matrix. In other words, replacing a corresponding location of the frame on the microdot matrix should not be limitations to determining a coordinate of the frame on the microdot matrix in the present invention.

Figure 6:
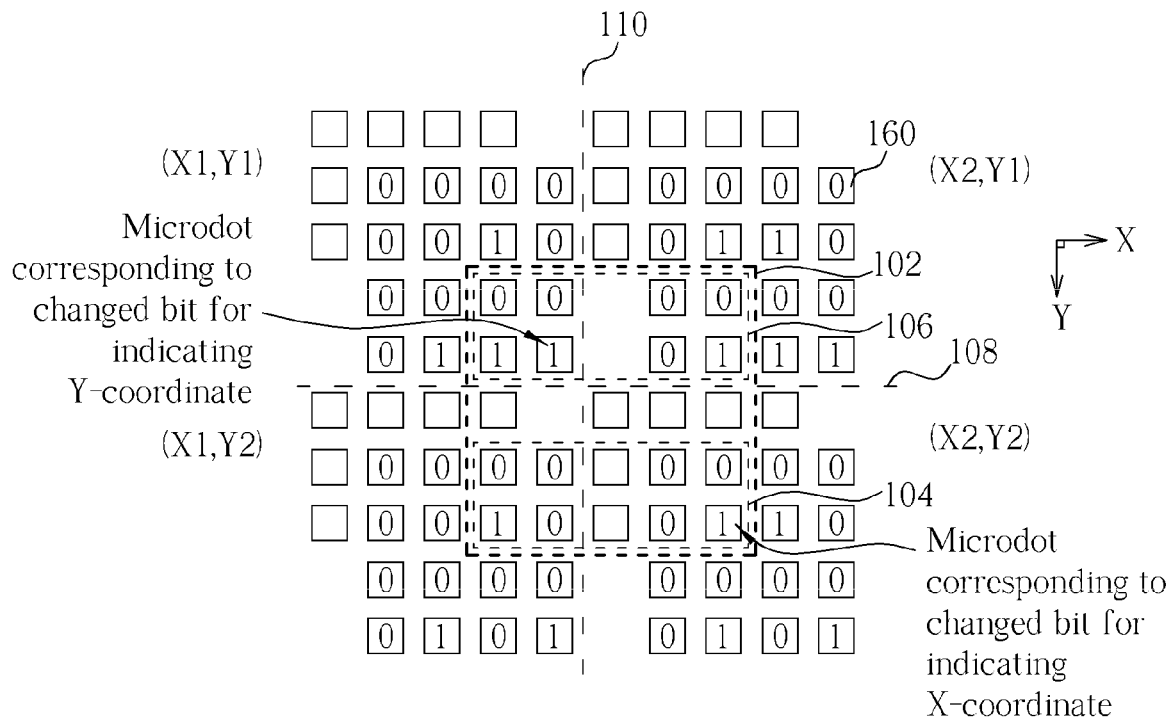
FIG. 6, FIG. 7, FIG. 8, FIG. 9, FIG. 10, and FIG. 11 illustrate determining a closest location of a center point of a frame on the microdot matrix by decoding the center point of the frame according to one embodiment of the present invention.

Please refer to FIG. 6, which is a diagram of determining a closest location of a center point of a frame 102 on the microdot matrix by decoding the center point of the frame 102 according to one embodiment of the present invention. Note that the closest location of the frame 102 on the microdot matrix is regarded as a coordinate of the frame 102 on the microdot matrix herein. Note that the frame 102 covers part of four microdot blocks 150 shown in FIG. 4 and FIG. 5. The center point is located at a geometric center of the frame 102 so that said center point is not further marked in the following diagrams for brevity and clearness of the diagrams. Similarly, for brevity of the following diagrams, the microdot blocks 150, the header regions 152, and the data regions 154 are not further marked as well. However, the pair of orthogonal and cross lines for segmenting the four microdot blocks 150 in the above diagrams are still indicated with a horizontal line 108 and a vertical line 110, which are distributed by following the shape of each the header region 152. In the frame 102, the horizontal line 108 serves as the X axis, whereas the vertical line 110 serves as the Y axis; however, both the horizontal line 108 and the vertical line 110 are merely used for explaining the encoding and decoding method of the present invention, and are not necessarily required to be plotted physically on the frame 102 or the microdot matrix in practical applications according to embodiments of the present invention. As shown in FIG. 6, the frame 102 covers a plurality of rectangle codes 160. Note that in the frame 102, the rectangle codes 160 having bits within indicate the rectangle codes, which are marked with bits, of the data region 154, whereas the rectangle codes 160 not having bits indicate the rectangle codes, which are marked with bits 1, of the header region 152. As shown in FIG. 6, according to descriptions related to FIG. 3, FIG. 4, and FIG. 5, a plurality of rectangle codes included by a X-coordinate region 104 covered by the frame 102 is used for indicating a X-coordinate X, whose value may be X1 or X2 since X-coordinates of the four microdot blocks 150 partially covered by the frame 102 must be X1 or X2. Similarly, a plurality of rectangle codes included by a Y-coordinate region 106 covered by the frame 102 is used for indicating a Y-coordinate Y, whose value may be Y1 or Y2 since Y-coordinates of the four microdot blocks 150 partially covered by the frame 102 must be Y1 or Y2. According to the distribution of bits or rectangle codes in the data region 154 for indicating a corresponding coordinate, and according to the distribution of bits covered by the X-coordinate region 104 and the Y-coordinate region 106 shown in FIG. 7, a Reflected Gray Code for decoding the X-coordinate X from the X-coordinate region 104 is '00000110', and a Reflected Gray Code for decoding the Y-coordinate Y from the Y-coordinate region 106 is '00000111'; by recognizing numbers of bits in both the Reflected Gray Codes, the X-coordinate X has an even Reflected Gray Code, whereas the Y-coordinate Y has an odd Reflected Gray Code. Since the X-coordinate X has an even Reflected Gray Code, according to the basic property (2) mentioned in FIG. 2, the changed bit in the Reflected Gray Code '00000110' of the X-coordinate X is the italic bit, and occupies a corresponding location at a right side of the vertical line 110, which is the Y axis on the frame 102, and on the X-coordinate region 104 so that the X-coordinate X should be decoded to be X2. Similarly, since the Y-coordinate Y has an odd Reflected Gray Code, according to the basic property (3) mentioned in FIG. 2, the changed bit in the Reflected Gray Code '00000111' of the Y-coordinate Y is the italic bit, and occupies a corresponding location at a top side of the horizontal line 108, which is the X axis on the frame 102, and on the Y-coordinate region 106 so that the Y-coordinate Y should be decoded to be Y1. As a summary, a coordinate of the frame 102 on the microdot matrix is (X2, Y1), which is the coordinate of the microdot block partially located at a northeast corner of the frame 102.

Figure 7:
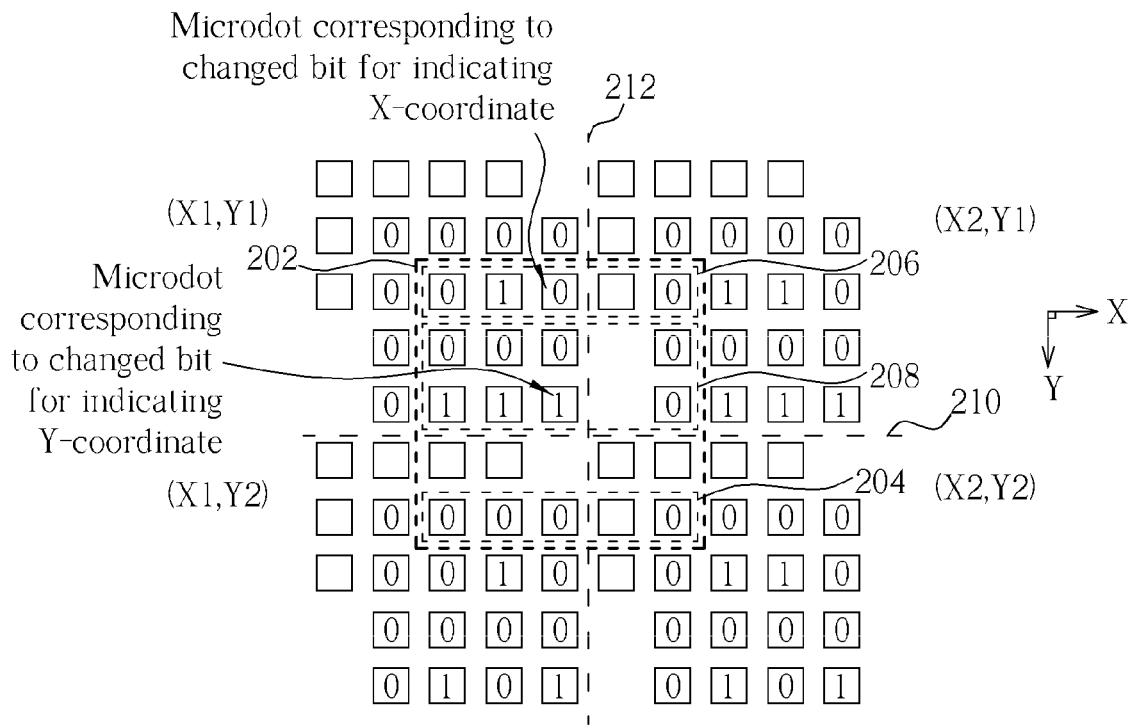

Please refer to FIG. 7. A frame 202 is segmented by a pair of orthogonal and cross lines, i.e., a horizontal line 210 and a vertical line 212. The frame 202 covers a first X-coordinate region 204, a second X-coordinate region 206, and a Y-coordinate region 208. Note that an X-coordinate X of the frame 202 is determined by simultaneously decoding both the first X-coordinate region 204 and the second X-coordinate region 206, and a Y-coordinate Y of the frame 202 is determined by decoding the Y-coordinate region 208. As shown in FIG. 7, a Reflected Gray Code of the X-coordinate X determined by decoding both the first X-coordinate region 204 and the second X-coordinate region 206 is '00000010' so that the X-coordinate X of the frame 202 has an odd Reflected Gray Code, where the changed bit is indicated in an italic form. Since the changed bit occupies a corresponding location at a left side of the vertical line 212 and within the second X-coordinate region 206, the X-coordinate of the frame 202 should be decoded to be X1. Similarly, after decoding the Y-coordinate region 208, a Reflected Gray Code of the Y-coordinate Y of the frame 202 is decoded to be '00000111' so that said Y-coordinate Y of the frame 202 has an odd Reflected Gray Code, and the changed bit is marked in italic. Since the changed bit is located within the Y-coordinate region 208 and at a top side of the horizontal line 210, the Y-coordinate Y of the frame 202 is decoded to be Y1. In summary, the coordinate of the frame 202 is decoded to be (X1, Y1), which is the coordinate of the microdot block partially located at the northwest corner of the frame 202.

Figure 8:
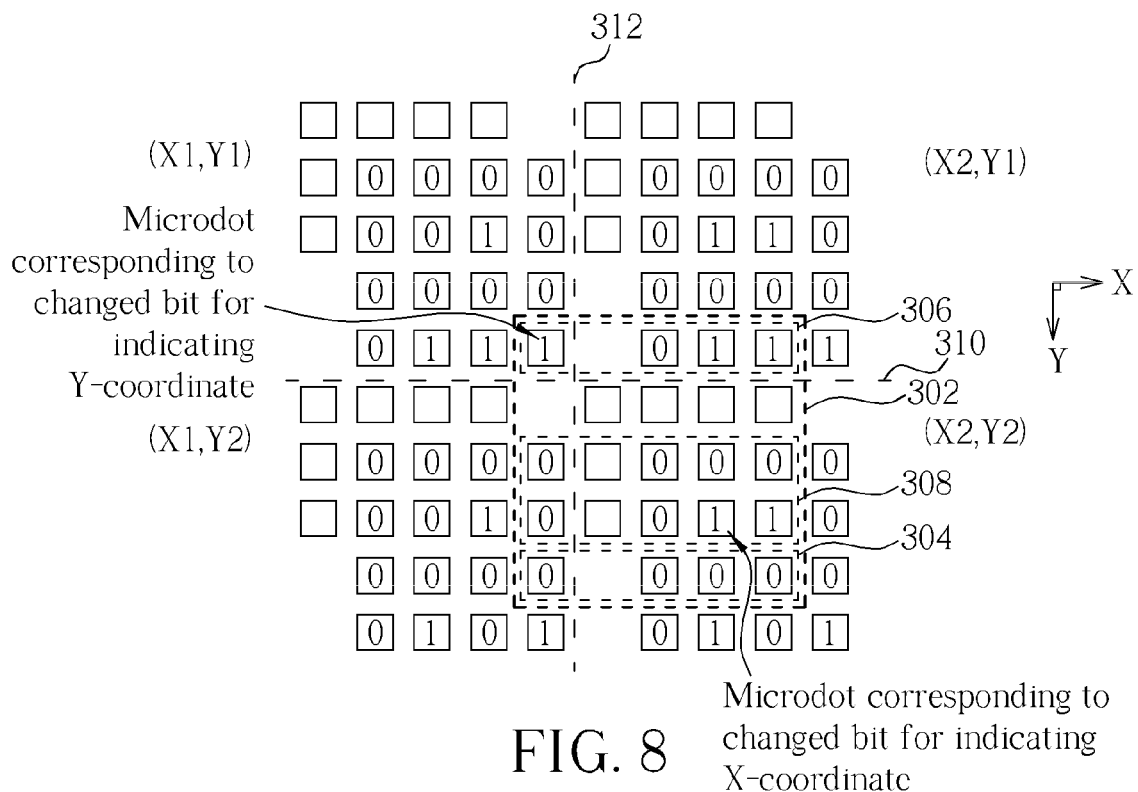
Figure 9:
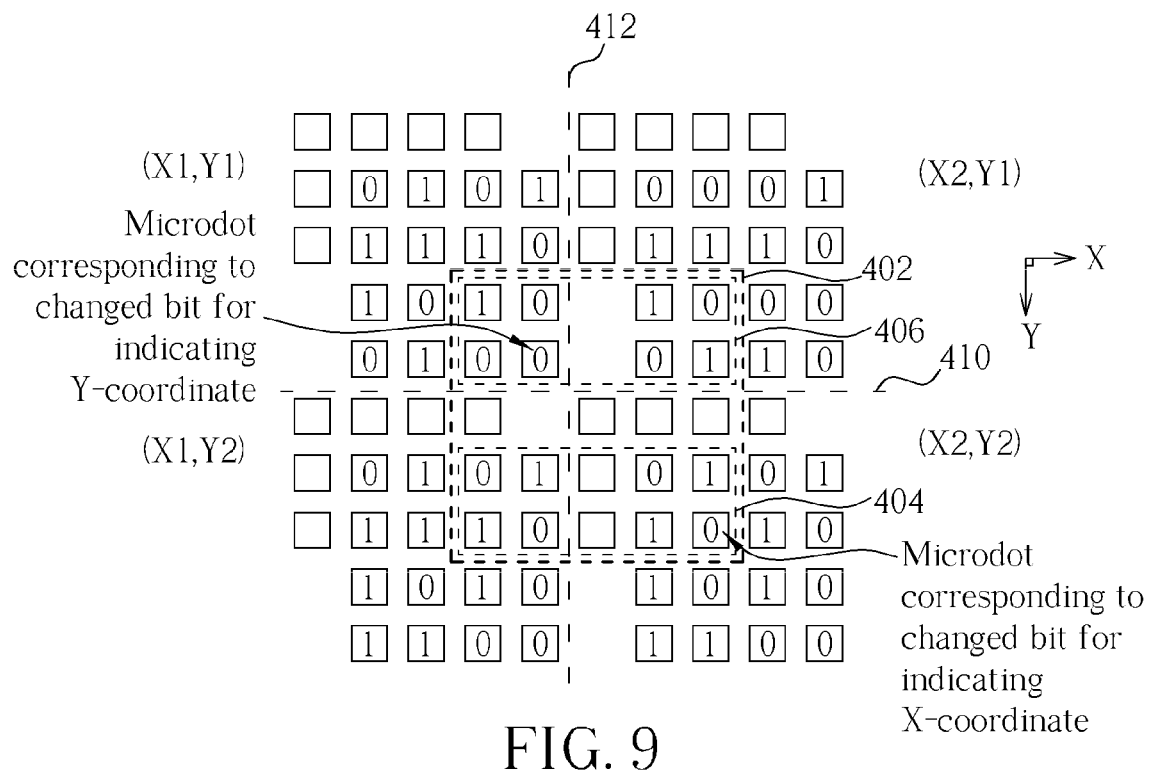

Please refer to FIG. 8. A frame 302 is segmented by a pair of orthogonal and cross lines, i.e., a horizontal line 310 and a vertical line 312. The frame 302 covers a first Y-coordinate region 304, a second Y-coordinate region 306, and an X-coordinate region 308. In the frame 302, the Y-coordinate Y of the frame 302 is determined by simultaneously decoding both the first Y-coordinate region 304 and the second Y-coordinate region 306, and the X-coordinate X of the frame 302 is determined by decoding the X-coordinate region 308. As shown in FIG. 9, a Reflected Gray Code of the Y-coordinate Y determined by decoding both the first Y-coordinate region 304 and the second Y-coordinate region 306 is '00000111' so that the Y-coordinate Y of the frame 302 has an odd Reflected Gray Code, and the changed bit is marked in italic. Since the changed bit occupies a location within the second Y-coordinate region 306 and at a top side of the horizontal line 310, the Y-coordinate Y of the frame 302 should be decoded to be Y1. Similarly, after decoding the X-coordinate region 308, a Reflected Gray Code of the X-coordinate X of the frame 302 is decoded to be '00000110' so that the X-coordinate X of the frame 302 has an even Reflected Gray Code, and the changed bit is marked in italic. Since the changed bit occupies a location within the X-coordinate region 308 and a right side of the vertical line 312, the X-coordinate X of the frame 302 is decoded to be X2. In summary, the coordinate of the frame 302 is decoded to be (X2, Y1), which is the coordinate of the microdot block partially located at a northeast corner of the frame 302.

Please refer to FIG. 9. A frame 402 is segmented by a pair of orthogonal and cross lines, i.e., a horizontal line 410 and a vertical line 412. The frame 402 covers an X-coordinate region 404 and a Y-coordinate region 406. In the frame 402, the X-coordinate X of the frame 402 is determined by decoding the X-coordinate region 404, and the Y-coordinate Y of the frame 402 is determined by decoding the Y-coordinate region 406. As shown in FIG. 9, a Reflected Gray Code of the X-coordinate X determined by decoding the X-coordinate region 404 is '01011010' so that the X-coordinate X of the frame 402 has an even Reflected Gray Code, and the changed bit is marked in italic. Since the changed bit occupies a corresponding location within the X-coordinate region 404 and at a right side of the vertical line 412, the X-coordinate X of the frame 402 should be decoded to be X2. Similarly, after decoding the Y-coordinate region 406, a Reflected Gray Code of the Y-coordinate Y of the frame 402 is decoded to be '10100100' so that the Y-coordinate Y of the frame 402 has an odd Reflected Gray Code, and the changed bit is marked in italic. Since the changed bit occupies a corresponding location within the Y-coordinate region 406 and at a top side of the horizontal line 410, the Y-coordinate Y of the frame 402 is decoded to be Y1. In summary, the coordinate of the frame 402 is decoded to be (X2, Y1), which is the coordinate of the microdot block partially located at the northeast corner of the frame 402.

Figure 10:
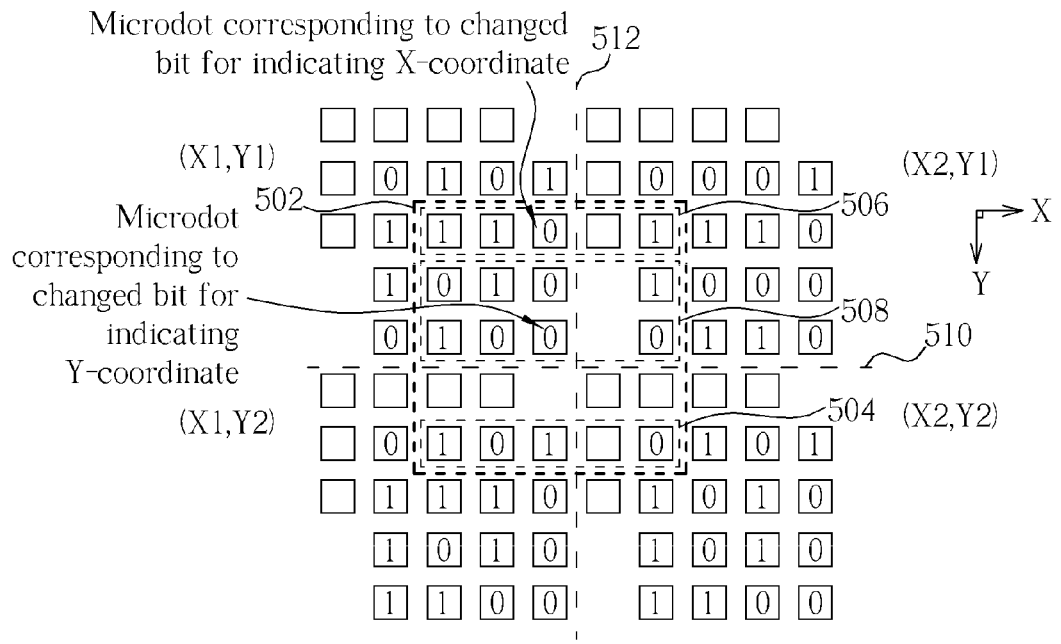

Please refer to FIG. 10. A frame 502 is segmented by a pair of orthogonal and cross lines, i.e., a horizontal line 510 and a vertical line 512. The frame 502 covers a first X-coordinate region 504, a second X-coordinate region 506, and a Y-coordinate region 508. Note that the X-coordinate X of the frame 502 is determined by simultaneously decoding both the first X-coordinate region 504 and the second X-coordinate region 506, and the Y-coordinate Y of the frame 502 is determined by decoding the Y-coordinate region 508. As shown in FIG. 10, a Reflected Gray Code of the X-coordinate X determined by decoding both the first X-coordinate region 504 and the second X-coordinate region 506 is '01011110' so that the X-coordinate X of the frame 502 has an odd Reflected Gray Code, and the changed bit is marked in italic. Since the changed bit occupies a corresponding location within the second X-coordinate region 506 and at a left side of the vertical line 512, the X-coordinate X of the frame 502 should be decoded to be X1. Similarly, after decoding the Y-coordinate region 508, a Reflected Gray Code of the Y-coordinate Y of the frame 502 is decoded to be '10100100' so that the Y-coordinate Y of the frame 502 has an odd Reflected Gray Code, and the changed bit is marked in italic. Since the changed bit occupies a corresponding location within the Y-coordinate region 508 and at a top side of the horizontal line 510, the Y-coordinate Y of the frame 502 is decoded to be Y1. In summary, the coordinate of the frame 502 is decoded to be (X1, Y1), which is the coordinate of the microdot block partially located at a northwest corner of the frame 502.

Figure 11:
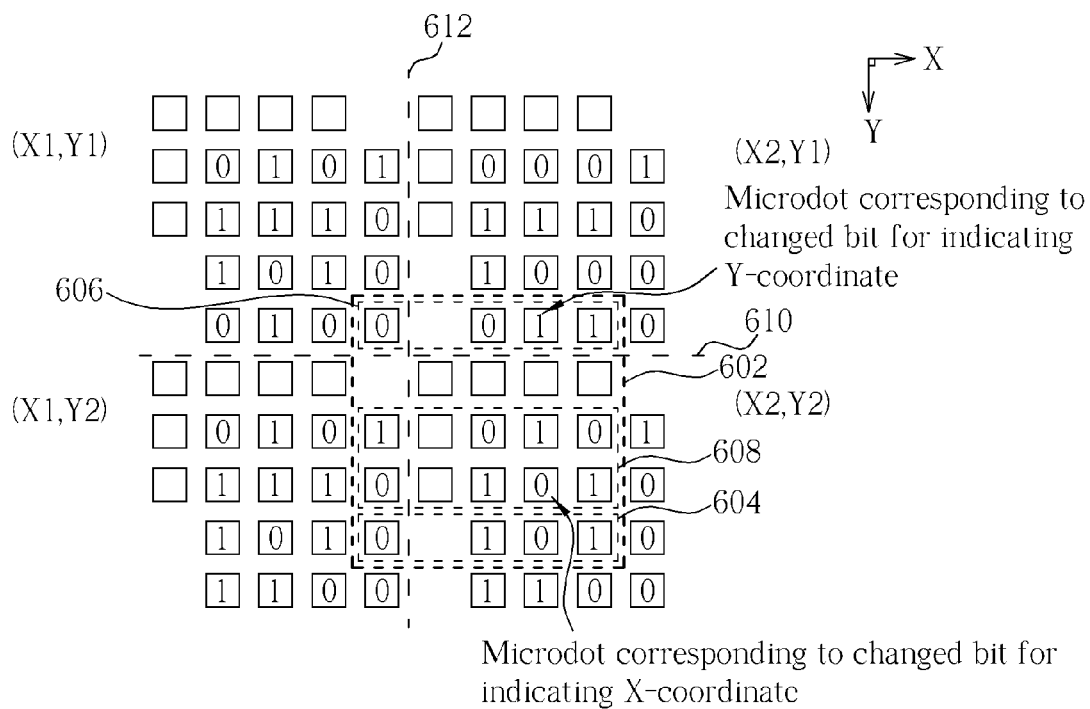

Please refer to FIG. 11. A frame 602 is segmented by a pair of orthogonal and cross lines, i.e., a horizontal line 610 and a vertical line 612. The frame 602 covers a first Y-coordinate region 604, a second Y-coordinate region 606, and an X-coordinate region 608. In the frame 602, the Y-coordinate Y of the frame 602 is determined by simultaneously decoding both the first Y-coordinate region 604 and the second Y-coordinate region 606, and the X-coordinate X of the frame 602 is determined by decoding the X-coordinate region 608. As shown in FIG. 11, a Reflected Gray Code of the Y-coordinate Y determined by decoding both the first Y-coordinate region 604 and the second Y-coordinate region 606 is '10100110' so that the Y-coordinate Y of the frame 602 has an even Reflected Gray Code, and the changed bit is marked in italic. Since the changed bit occupies a corresponding location within the second Y-coordinate region 606 and at a top side of the horizontal line 610, the Y-coordinate Y of the frame 602 should be decoded to be Y1. Similarly, after decoding the X-coordinate region 608, a Reflected Gray Code of the X-coordinate X of the frame 602 is decoded to be '01001010' so that the X-coordinate X of the frame 602 has an even Reflected Gray Code, and the changed bit is marked in italic. Since the changed bit occupies a corresponding location within the X-coordinate region 608 and at a right side of the vertical line 612, the X-coordinate X of the frame 602 should be decoded to be X2. In summary, the coordinate of the frame 602 is decoded to be (X2, Y1), which is the coordinate of the microdot block partially located at the northeast corner of the frame 602.

Note that though embodiments from FIG. 6 to FIG. 11 are illustrated under a supposition that an included angle between the pair of orthogonal axes on the microdot matrix, i.e. the X-axis and the Y-axis illustrated above, and an orientation of the frame, is 0 degree. However, when the included angle is larger than 0 degree and less than 180 degrees, as mentioned in the prior art, the embodiments disclosed from FIG. 6 to FIG. 11 may still be used for decoding the coordinate of the frame on the microdot matrix by recognizing the header region included by each the microdot block after fetching the frame and thereby recognizing the orientation of the frame.

Figure 13:
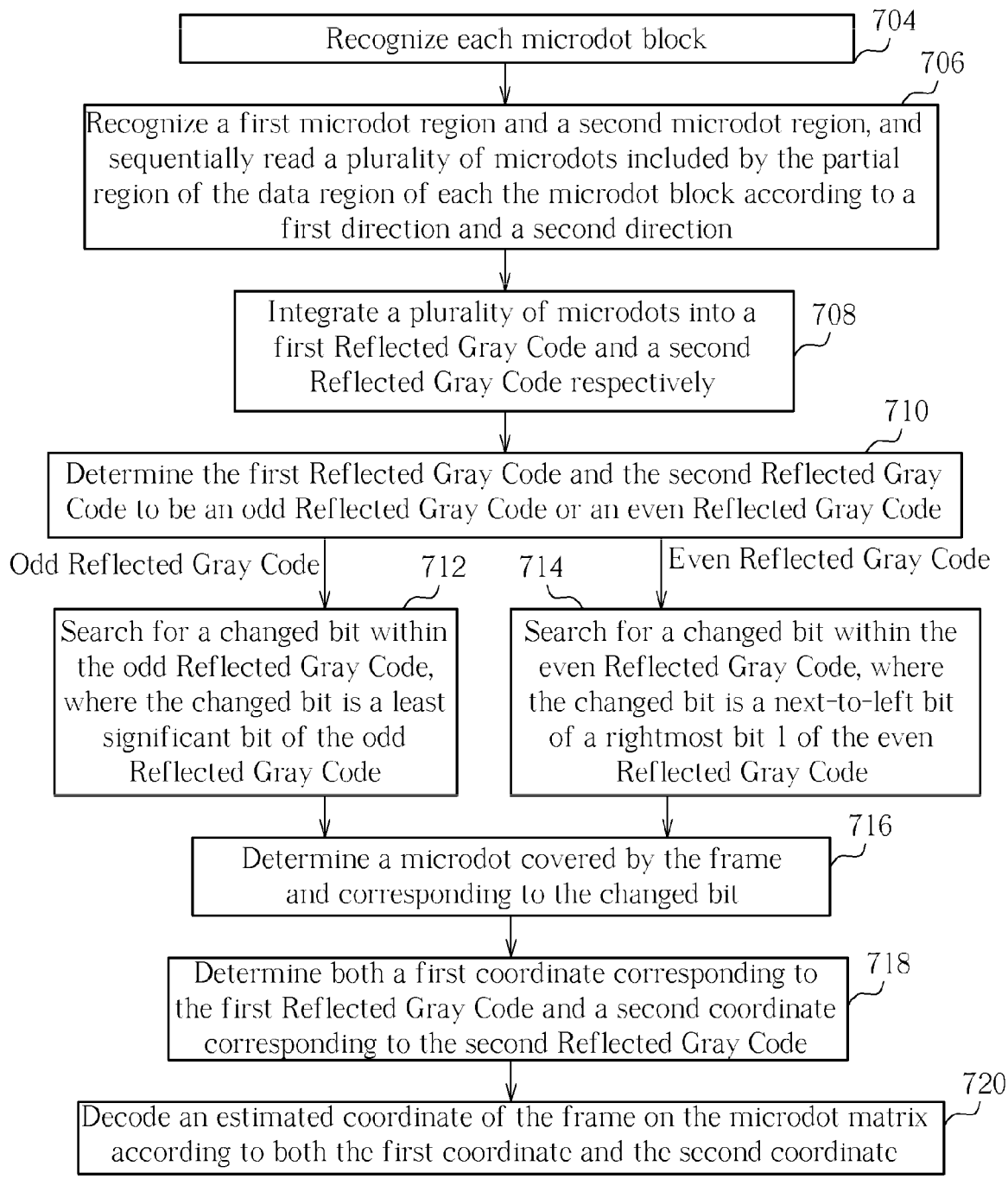
FIG. 13 is a flowchart of the decoding method of the present invention.

Please refer to FIG. 12 and FIG. 13. FIG. 12 is a flowchart of the encoding method of the present invention. FIG. 13 is a flowchart of the decoding method of the present invention. As shown in FIG. 12, the encoding method includes steps as follows:

Step 702: Encode a first coordinate and a second coordinate respectively by encoding based on Reflected Gray Code, and respectively plot the encoded first coordinate and second coordinate onto a first microdot region and a second microdot region of a data region, which is included by each microdot block on a microdot matrix, according to a first direction, which is indicated by a first coordinate axis of the microdot matrix, a second direction, which is indicated by a second coordinate axis of the microdot matrix, and a coordinate of each the microdot block on the microdot matrix.

As shown in FIG. 13, the decoding method of the present invention includes steps as follows:

Step 704: Recognize each microdot block in a frame generated by scanning a microdot matrix according to partial region, which is recognized according to the frame, of a header region of each the microdot block in the frame;

Step 706: Recognize a first microdot region and a second microdot region with partial region, which is covered by the frame, of a data region of each the microdot in the frame, and sequentially read a plurality of microdots included by the partial region of the data region of each the microdot block according to a first direction, which is indicated by a first coordinate axis used by the microdot matrix, and a second direction, which is indicated by a second coordinate axis used by the microdot matrix;

Step 708: Integrate a plurality of microdots, which are respectively included by the first microdot region and the second microdot region in a same microdot block or in different microdot blocks, into a first Reflected Gray Code and a second Reflected Gray Code respectively;

Step 710: Determine the first Reflected Gray Code and the second Reflected Gray Code to be an odd Reflected Gray Code or an even Reflected Gray Code according to numbers of bits 1 within both the first Reflected Gray Code and the second Reflected Gray Code; when the first Reflected Gray Code or the second Reflected Gray Code is an odd Reflected Gray Code, go to Step 712; else, go to Step 714;

Step 712: Search for a changed bit within the odd Reflected Gray Code so that merely the changed bit is required to be changed while an even Reflected Gray Code is transformed into the odd Reflected Gray Code, where the changed bit is a least significant bit of the odd Reflected Gray Code, then go to Step 716;

Step 714: Search for a changed bit within the even Reflected Gray Code so that merely the changed bit is required to be changed while an odd Reflected Gray Code is transformed into the even Reflected Gray Code, where the changed bit is a next-to-left bit of a rightmost bit 1 of the even Reflected Gray Code, then go to Step 716;

Step 716: Determine a microdot covered by the frame and corresponding to the changed bit;

Step 718: Determine both a first coordinate, which corresponds to the first Reflected Gray Code, and a second coordinate, which corresponds to the second Reflected Gray Code, according to a relative relation between the determined microdot corresponding to the changed bit and a coordinate axis of the frame; and Step 720: Decode an estimated coordinate of the frame on the microdot matrix according to both the first coordinate and the second coordinate.

Steps from Step 702 to Step 720 indicate a summary of descriptions from FIG. 2 to FIG. 11 according to the encoding and decoding method of the present invention. Step 702 indicates the encoding performed on the microdot matrix and based on Reflected Gray Code. Steps from Step 704 to Step 720 indicate the decoding based on the encoding of Step 702 after scanning the frame on the microdot matrix.

As shown in FIG. 3, in Step 702, the first coordinate axis indicates the abovementioned X axis, and the second coordinate axis indicates the abovementioned Y axis; therefore, the first direction indicates an incremental direction of the X axis, and the second direction indicates an incremental direction of the Y axis. The first microdot region indicates the region BitX shown in FIG. 3 and the X-coordinate regions shown in the following diagrams, therefore, the first coordinate indicates the X-coordinate of the microdot, which includes the first microdot region. The second microdot region indicates the region BitY shown in FIG. 3 and the Y-coordinate regions shown in the following diagrams, therefore, the second coordinate indicates the Y-coordinate of the microdot block, which includes the second microdot region.

As shown from FIG. 6 to FIG. 11, the four microdot blocks are partially covered by the frame. Moreover, while the frame is retrieved, the microdot blocks partially covered by the frame are recognized according to a pattern of the header, such as the empty codes included by the header region shown from FIG. 6 to FIG. 11, in advance. In Step 706, after recognizing each covered partial region of each the microdot block partially covered by the frame, both the first microdot region, which corresponds to a X-coordinate of the frame, and the second microdot region, which corresponds to a Y-coordinate of the frame, are recognized according to the encoding used in Step 702, and microdots previously plotted in both the first microdot region and the second microdot region may thereby be read according to a plotting order mentioned in descriptions related to FIG. 3 so as to determine both the first Reflected Gray Code, which indicates the X-coordinate X of the frame, and the second Reflected Gray Code, which indicates the Y-coordinate Y of the frame, in Step 708.

Steps including Step 710, Step 712, and Step 714 are performed according to the basic properties introduced in FIG. 2. In Step 710, the decoded Reflected Gray Code has to be determined to be an odd Reflected Gray Code or an even Reflected Gray Code in advance. In Step 712, while the decoded Reflected Gray Code is an odd Reflected Gray Code, the changed bit is searched for according to the basic property (2) in descriptions related to FIG. 2. Similarly, in Step 714, while the decoded Reflected Gray Code is an even Reflected Gray Code, the changed bit is searched for according to the basic property (3) in descriptions related to FIG. 2.

In Step 716, according to a result of steps including Step 710, Step 712, and Step 714, the microdot corresponding to the changed bit is determined on the frame. Then in Step 718, both the X-coordinate and the Y-coordinate of the frame are determined according to the changed bit, and according to both the horizontal line and the vertical line following the shape of the header region, which is covered by the frame. While the decoded Reflected Gray Code indicates the X-coordinate of a partially-covered microdot block, the microdot corresponding to the changed bit is compared with the vertical line of the frame in relative position since a value of a X-coordinate on the microdot matrix is changed with respect to different sides of the vertical line. Similarly, while the decoded Reflected Gray Code indicates the Y-coordinate of a partially-covered microdot block, the microdot corresponding to the changed bit is compared with the horizontal line of the frame in relative position since a value of a Y-coordinate on the microdot matrix is changed with respect to different sides of the horizontal line. As the can be observe from comparisons, which are introduced from FIG. 6 to FIG. 11 and between the microdot corresponding to the changed bit and both the vertical line and horizontal line used in the fetched frame, when the decoded Reflected Gray Code indicates a X-coordinate of a microdot block, and when the microdot corresponding to the changed bit is located at the right side of the vertical line, the X-coordinate of the frame is just the X-coordinate indicated by the right side of said vertical line, such as the X-coordinate X2 in the abovementioned embodiments; otherwise, when the microdot corresponding to the changed bit is located at the left side of the vertical line, the X-coordinate of the frame is the X-coordinate indicated by the left side of said vertical line, such as the X-coordinate X1 in the abovementioned embodiments. Similarly, when the decoded Reflected Gray Code indicates the Y-coordinate of a microdot block, and when the microdot corresponding to the changed bit is located at the top side of the horizontal line on the frame, the Y-coordinate of the frame is the Y-coordinate indicated by the top side of said horizontal line, such as the Y-coordinate Y1 in the abovementioned embodiments; otherwise, when the microdot corresponding to the changed bit is located at the bottom side of said horizontal line, the Y-coordinate of the frame is the Y-coordinate indicated by the bottom side of said horizontal line, such as the Y-coordinate Y2 in the abovementioned embodiments.

Last, in the Step 720, the determined X-coordinate and Y-coordinate of the microdot block in Step 718 are combined to decode an estimated two-dimensional coordinate of the frame on the microdot matrix.

Figure 14:
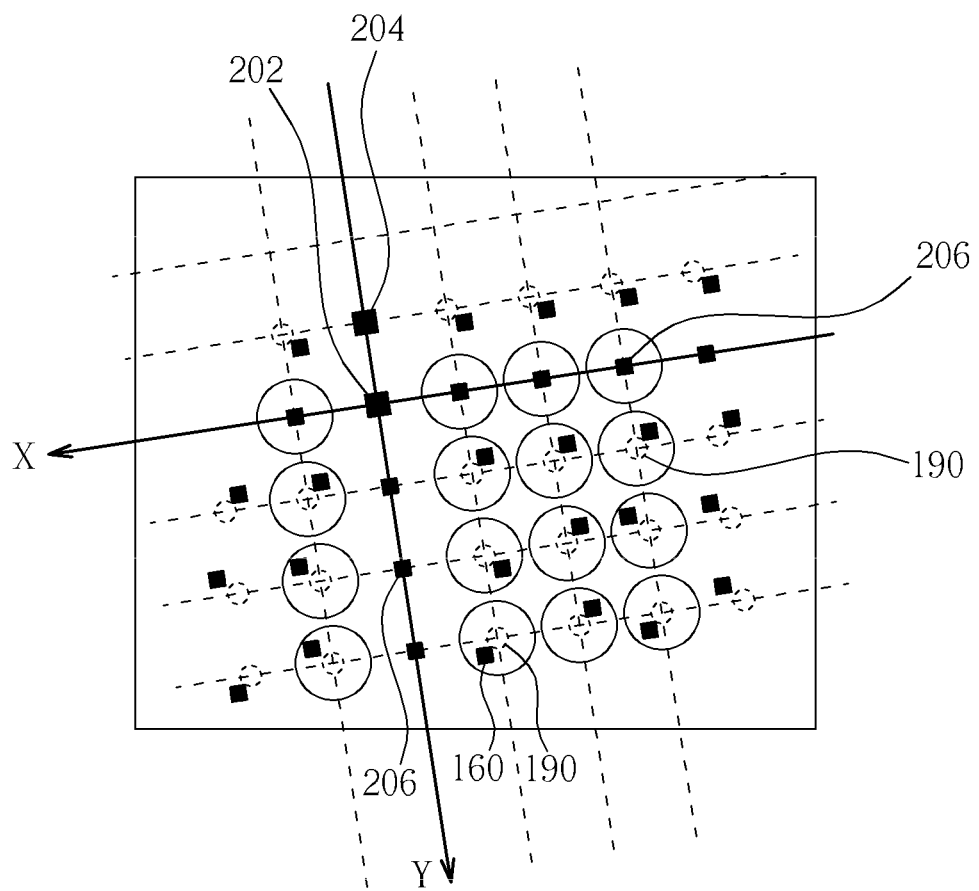
FIG. 14 is a diagram of applying the encoding based on Reflected Gray Code on data dots encoded according to four quadrants on a two-dimensional space according to one embodiment of the present invention, where the two-dimensional space lies on a microdot matrix.

Please refer to FIG. 14, which is a diagram of applying the encoding based on Reflected Gray Code on data dots encoded according to four quadrants on a two-dimensional space according to one embodiment of the present invention, where the two-dimensional space lies on a microdot matrix. As shown in FIG. 14, there are a plurality of boundary dots 206 on both the X axis and Y axis respective for indicating a boundary of each encoding block. On the Y axis, two directional grid dots 202 and 204 are further provided for recognizing a plurality of boundary grid dots, and thereby for recognizing each the encoding block. In each the encoding block, a plurality of virtual grid dots 190 are generated at intersections of virtual grid lines for serving as datum points of further depositing a plurality of rectangle codes 160, which acts as data dots on the microdot matrix. By depositing rectangle codes 160 at different quadrants around the plurality of virtual grid dots 190, each rectangle 160 may used for indicating a data string having 2 bits. For example, a rectangle 160 located at a first quadrant around a virtual grid dot 190 may used for indicating a bit string '00'; a rectangle 160 located at a second quadrant around a virtual grid dot 190 may used for indicating a bit string '01'; a rectangle 160 located at a third quadrant around a virtual grid dot 190 may used for indicating a bit string '10'; and a rectangle 160 located at a fourth quadrant around a virtual grid dot 190 may used for indicating a bit string '11'. Therefore, in comparison to the abovementioned embodiments of the present invention, Reflected Gray Codes having more bits may be encoded and decoded on the microdot matrix as well. FIG. 14 merely indicates an available application in the encoding and decoding method of the present invention by using Reflected Gray Code, however, embodiments of the encoding and decoding method of the present invention are not limited to the abovementioned representations of microdot matrix.

The present invention discloses an encoding and decoding method used on a microdot matrix, for neutralizing the defect that the coordinate of the frame on the microdot matrix can not be decoded since no complete microdot block is fetched on the scanned frame in the prior art. Primary characteristics of the disclosed method of the present invention lie in decoding the coordinate of the frame on the microdot matrix according to the unique changed bit between two consecutive Reflected Gray Codes while merely fetching microdots of partial data region of microdot blocks covered by the frame, and thereby the location of the frame on the microdot matrix may be instantly determined.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoding method of a microdot matrix, comprising:
   recognizing each microdot block of a microdot matrix according to a partial region of a header region comprised by each of the microdot blocks covered by a frame generated by scanning the microdot matrix;
   recognizing a first microdot region and a second microdot region within a partial region, which is recognized according to the frame and is covered by the frame, of a data region of each of the microdot blocks;
   reading a plurality of microdots one by one according to a first direction, which is indicated by a first coordinate axis of the microdot matrix, and a second direction, which is indicated by a second coordinate axis of the microdot matrix, within the partial region of the data region;

determining whether a first Reflected Gray Code is an odd Reflected Gray Code or an even Reflected Gray Code according to a number of bits 1 comprised by the first Reflected Gray Code;

integrating a plurality of read microdots covered by the frame and comprised by a partial region of the first microdot regions of different microdot blocks, which are covered by the frame, into the first Reflected Gray Code;

decoding the first Reflected Gray Code into a first coordinate, which is corresponding to the first coordinate axis;

integrating a plurality of read microdots covered by the frame and comprised by a partial region of the second microdot regions of a same microdot block, which is covered by the frame, into a second Reflected Gray Code;

decoding the second Reflected Gray Code into a second coordinate, which is corresponding to the second coordinate axis; and combining the first coordinate and the second coordinate to determine the estimated coordinate;

wherein the first coordinate axis is orthogonal to the second coordinate axis;

wherein a predetermined number of different bits exists between any two Reflected Gray Codes corresponding to two consecutive integer values; and wherein the plurality of microdots is plotted on the data region comprised by each of the microdot blocks of the microdot matrix according to the encoding based on Reflected Gray Codes.

2. The method of claim 1 further comprising:

searching for a changed bit in the first Reflected Gray Code when the first Reflected Gray Code is determined to be the odd Reflected Gray Code so that merely the changed bit is required to be changed while the even Reflected Gray Code is transformed into the first Reflected Gray Code;

determining a position of a microdot covered by the frame and corresponding to the changed bit; and determining whether the first coordinate has a first coordinate value or a second coordinate value according to a relative relation between a determined position of the microdot corresponding to the changed bit and a third coordinate axis;

wherein a difference between the even Reflected Gray Code and the first Reflected Gray Code merely lies in the changed bit;

wherein the changed bit is a least significant bit in the first Reflected Gray Code; and wherein the third coordinate axis is parallel to the first coordinate axis; the third coordinate axis segments a plurality of microdot blocks covered by the frame into a first region and a second region; a location of the first region is corresponding to the first coordinate value; and a location of the second region is corresponding to the second coordinate value.

3. The method of claim 2, wherein determining whether the first coordinate has the first coordinate value or the second coordinate value according to the relative relation between the determined position of the microdot corresponding to the changed bit and the third coordinate axis comprises:

determining the first coordinate has the first coordinate value when the position of the microdot corresponding to the changed bit and covered by the frame is located within the first region; and determining the first coordinate has the second coordinate value when the position of the microdot corresponding to the changed bit and covered by the frame is located within the second region.

4. The method of claim 1 further comprising:

searching for a changed bit in the first Reflected Gray Code when the first Reflected Gray Code is determined to be the even Reflected Gray Code so that merely the changed bit is required to be changed while the odd Reflected Gray Code is transformed into the first Reflected Gray Code;

determining a position of a microdot covered by the frame and corresponding to the changed bit; and determining whether the first coordinate has a first coordinate value or a second coordinate value according to a relative relation between a determined position of the microdot corresponding to the changed bit and a third coordinate axis;

wherein a difference between the odd Reflected Gray Code and the first Reflected Gray Code merely lies in the changed bit;

wherein the changed bit is a next-to-left bit to a rightmost bit 1 in the first Reflected Gray Code; and wherein the third coordinate axis is parallel to the first coordinate axis, the third coordinate axis segments a plurality of microdot blocks covered by the frame into a first region and a second region, a location of the first region is corresponding to the first coordinate value, and a location of the second region is corresponding to the second coordinate value.

5. The method of claim 4, wherein determining whether the first coordinate has the first coordinate value or the second coordinate value according to the relative relation between the determined position of the microdot corresponding to the changed bit and the third coordinate axis comprises:

determining that the first coordinate has the first coordinate value when the position of the microdot corresponding to the changed bit and covered by the frame is located within the first region; and determining that the first coordinate has the second coordinate value when the position of the microdot corresponding to the changed bit and covered by the frame is located within the second region.

6. A decoding method of a microdot matrix, comprising:

recognizing each microdot block of a microdot matrix according to a partial region of a header region comprised by each of the microdot blocks covered by a frame generated by scanning the microdot matrix;

recognizing a first microdot region and a second microdot region within a partial region, which is recognized according to the frame and is covered by the frame, of a data region of each of the microdot blocks;

reading a plurality of microdots one by one according to a first direction, which is indicated by a first coordinate axis of the microdot matrix, and a second direction, which is indicated by a second coordinate axis of the microdot matrix, within the partial region of the data region;

integrating a plurality of read microdots covered by the frame and comprised by a partial region of the first microdot regions of different microdot blocks, which are covered by the frame, into a first Reflected Gray Code;

decoding the first Reflected Gray Code into a first coordinate, which is corresponding to the first coordinate axis;

integrating a plurality of read microdots covered by the frame and comprised by a partial region of the second microdot regions of a same microdot block, which is covered by the frame, into a second Reflected Gray Code;

determining whether the second Reflected Gray Code is an odd Reflected Gray Code or an even Reflected Gray Code according to a number of bits 1 in the second Reflected Gray Code;

decoding the second Reflected Gray Code into a second coordinate, which is corresponding to the second coordinate axis; and combining the first coordinate and the second coordinate to determine the estimated coordinate;

wherein the first coordinate axis is orthogonal to the second coordinate axis;

wherein a predetermined number of different bits exists between any two Reflected Gray Codes corresponding to two consecutive integer values; and wherein the plurality of microdots is plotted on the data region comprised by each of the microdot blocks of the microdot matrix according to the encoding based on Reflected Gray Codes.

7. The method of claim 6 further comprising:

searching for a changed bit in the second Reflected Gray Code when the second Reflected Gray Code is determined to be the odd Reflected Gray Code so that merely the changed bit is required to be changed while the even Reflected Gray Code is transformed into the second Reflected Gray Code;

determining a position of a microdot covered by the frame and corresponding to the changed bit; and determining whether the second coordinate has a third coordinate value or a fourth coordinate value according to a relative relation between a determined position of the microdot corresponding to the changed bit and a fourth coordinate axis;

wherein a difference between the even Reflected Gray Code and the second Reflected Gray Code merely lies in the changed bit;

wherein the changed bit is a least significant bit in the second Reflected Gray Code; and wherein the fourth coordinate axis is parallel to the second coordinate axis, the fourth coordinate axis segments a plurality of microdot blocks covered by the frame into a third region and a fourth region, a location of the third region is corresponding to the third coordinate value, and a location of the fourth region is corresponding to the fourth coordinate value.

8. The method of claim 7, wherein determining whether the second coordinate has the third coordinate value or the fourth coordinate value according to the relative relation between the determined position of the microdot corresponding to the changed bit and the fourth coordinate axis comprises:

determining the second coordinate has the third coordinate value when the position of the microdot corresponding to the changed bit and covered by the frame is located within the third region; and determining the second coordinate has the fourth coordinate value when the position of the microdot corresponding to the changed bit and covered by the frame is located within the fourth region.

9. The method of claim 6 further comprising:

searching for a changed bit in the second Reflected Gray Code when the second Reflected Gray Code is determined to be the even Reflected Gray Code so that merely the changed bit is required to be changed while the odd Reflected Gray Code is transformed into the second Reflected Gray Code;

determining a position of a microdot covered by the frame and corresponding to the changed bit; and determining whether the second coordinate has a third coordinate value or a fourth coordinate value according to a relative relation between a determined position of the microdot corresponding to the changed bit and a fourth coordinate axis;

wherein a difference between the odd Reflected Gray Code and the second Reflected Gray Code merely lies in the changed bit;

wherein the changed bit is a next-to-left bit to a rightmost bit 1 in the second Reflected Gray Code; and wherein the fourth coordinate axis is parallel to the second coordinate axis, the fourth coordinate axis segments a plurality of microdot blocks covered by the frame into a third region and a fourth region, a location of the third region is corresponding to the third coordinate value, and a location of the fourth region is corresponding to the fourth coordinate value.

10. The method of claim 9, wherein determining whether the second coordinate has the third coordinate value or the fourth coordinate value according to the relative relation between the determined position of the microdot corresponding to the changed bit and the fourth coordinate axis comprises:

determining that the second coordinate has the third coordinate value when the position of the microdot corresponding to the changed bit and covered by the frame is located within the third region; and determining that the second coordinate has the fourth coordinate value when the position of the microdot corresponding to the changed bit and covered by the frame is located within the fourth region.

11. A decoding method of a microdot matrix, comprising:

recognizing each microdot block of a microdot matrix according to a partial region of a header region comprised by each of the microdot blocks covered by a frame generated by scanning the microdot matrix;

recognizing a first microdot region and a second microdot region within a partial region, which is recognized according to the frame and is covered by the frame, of a data region of each of the microdot blocks;

reading a plurality of microdots one by one according to a first direction, which is indicated by a first coordinate axis of the microdot matrix, and a second direction, which is indicated by a second coordinate axis of the microdot matrix, within the partial region of the data region;

integrating a plurality of read microdots covered by the frame and comprised by the first microdot region of a same microdot block, which is covered by the frame, into a first Reflected Gray Code;

decoding the first Reflected Gray Code into a first coordinate, which is corresponding to the first coordinate axis;

integrating a plurality of read microdots covered by the frame and comprised by a partial region of the second microdot regions of different microdot blocks, which are covered by the frame, into a second Reflected Gray Code;

decoding the second Reflected Gray Code into a second coordinate, which is corresponding to the second coordinate axis; and combining the first coordinate and the second coordinate to determine the estimated coordinate;

wherein the first coordinate axis is orthogonal to the second coordinate axis;

wherein a predetermined number of different bits exists between any two Reflected Gray Codes corresponding to two consecutive integer values; and wherein the plurality of microdots is plotted on the data region comprised by each of the microdot blocks of the microdot matrix according to the encoding based on Reflected Gray Codes.

12. The method of claim 11 further comprising:

determining whether the first Reflected Gray Code is an odd Reflected Gray Code or an even Reflected Gray Code according to a number of bits 1 comprised by the first Reflected Gray Code.

13. The method of claim 12 further comprising:

searching for a changed bit in the first Reflected Gray Code when the first Reflected Gray Code is determined to be the odd Reflected Gray Code so that merely the changed bit is required to be changed while the even Reflected Gray Code is transformed into the first Reflected Gray Code;

determining a position of a microdot covered by the frame and corresponding to the changed bit; and determining whether the first coordinate has a first coordinate value or a second coordinate value according to a relative relation between a determined position of the microdot corresponding to the changed bit and a third coordinate axis;

wherein a difference between the even Reflected Gray Code and the first Reflected Gray Code merely lies in the changed bit;

wherein the changed bit is a least significant bit in the first Reflected Gray Code; and wherein the third coordinate axis is parallel to the first coordinate axis, the third coordinate axis segments a plurality of microdot blocks covered by the frame into a first region and a second region, a location of the first region is corresponding to the first coordinate value, and a location of the second region is corresponding to the second coordinate value.

14. The method of claim 13, wherein determining whether the first coordinate has the first coordinate value or the second coordinate value according to the relative relation between the determined position of the microdot corresponding to the changed bit and the third coordinate axis comprises:

determining the first coordinate has the first coordinate value when the position of the microdot corresponding to the changed bit and covered by the frame is located within the first region; and determining the first coordinate has the second coordinate value when the position of the microdot corresponding to the changed bit and covered by the frame is located within the second region.

15. The method of claim 12 further comprising:

searching for a changed bit in the first Reflected Gray Code when the first Reflected Gray Code is determined to be the even Reflected Gray Code so that merely the changed bit is required to be changed while the odd Reflected Gray Code is transformed into the first Reflected Gray Code;

determining a position of a microdot covered by the frame and corresponding to the changed bit; and determining whether the first coordinate has a first coordinate value or a second coordinate value according to a relative relation between a determined position of the microdot corresponding to the changed bit and a third coordinate axis;

wherein a difference between the odd Reflected Gray Code and the first Reflected Gray Code merely lies in the changed bit;

wherein the changed bit is a next-to-left bit to a rightmost bit 1 in the first Reflected Gray Code; and wherein the third coordinate axis is parallel to the first coordinate axis; the third coordinate axis segments a plurality of microdot blocks covered by the frame into a first region and a second region; a location of the first region is corresponding to the first coordinate value; and a location of the second region is corresponding to the second coordinate value.

16. The method of claim 15, wherein determining whether the first coordinate has the first coordinate value or the second coordinate value according to the relative relation between the determined position of the microdot corresponding to the changed bit and the third coordinate axis comprises:

determining that the first coordinate has the first coordinate value when the position of the microdot corresponding to the changed bit and covered by the frame is located within the first region; and determining that the first coordinate has the second coordinate value when the position of the microdot corresponding to the changed bit and covered by the frame is located within the second region.

17. The method of claim 11 further comprising:

determining whether the second Reflected Gray Code is an odd Reflected Gray Code or an even Reflected Gray Code according to a number of bits 1 in the second Reflected Gray Code.

18. The method of claim 17 further comprising:

searching for a changed bit in the second Reflected Gray Code when the second Reflected Gray Code is determined to be the odd Reflected Gray Code so that merely the changed bit is required to be changed while the even Reflected Gray Code is transformed into the second Reflected Gray Code;

determining a position of a microdot covered by the frame and corresponding to the changed bit; and determining whether the second coordinate has a third coordinate value or a fourth coordinate value according to a relative relation between a determined position of the microdot corresponding to the changed bit and a fourth coordinate axis;

wherein a difference between the even Reflected Gray Code and the second Reflected Gray Code merely lies in the changed bit;

wherein the changed bit is a least significant bit in the second Reflected Gray Code; and wherein the fourth coordinate axis is parallel to the second coordinate axis; the fourth coordinate axis segments a plurality of microdot blocks covered by the frame into a third region and a fourth region; a location of the third region is corresponding to the third coordinate value; and a location of the fourth region is corresponding to the fourth coordinate value.

19. The method of claim 18, wherein determining whether the second coordinate has the third coordinate value or the fourth coordinate value according to the relative relation between the determined position of the microdot corresponding to the changed bit and the fourth coordinate axis comprises:

determining the second coordinate has the third coordinate value when the position of the microdot corresponding to the changed bit and covered by the frame is located within the third region; and determining the second coordinate has the fourth coordinate value when the position of the microdot corresponding to the changed bit and covered by the frame is located within the fourth region.

20. The method of claim 17 further comprising:

searching for a changed bit in the second Reflected Gray Code when the second Reflected Gray Code is determined to be the even Reflected Gray Code so that merely the changed bit is required to be changed while the odd Reflected Gray Code is transformed into the second Reflected Gray Code;

determining a position of a microdot covered by the frame and corresponding to the changed bit; and determining whether the second coordinate has a third coordinate value or a fourth coordinate value according to a relative relation between a determined position of the microdot corresponding to the changed bit and a fourth coordinate axis;

wherein a difference between the odd Reflected Gray Code and the second Reflected Gray Code merely lies in the changed bit;

wherein the changed bit is a next-to-left bit to a rightmost bit 1 in the second Reflected Gray Code; and wherein the fourth coordinate axis is parallel to the second coordinate axis; the fourth coordinate axis segments a plurality of microdot blocks covered by the frame into a third region and a fourth region; a location of the third region is corresponding to the third coordinate value; and a location of the fourth region is corresponding to the fourth coordinate value.

21. The method of claim 20, wherein determining whether the second coordinate has the third coordinate value or the fourth coordinate value according to the relative relation between the determined position of the microdot corresponding to the changed bit and the fourth coordinate axis comprises:

determining that the second coordinate has the third coordinate value when the position of the microdot corresponding to the changed bit and covered by the frame is located within the third region; and determining that the second coordinate has the fourth coordinate value when the position of the microdot corresponding to the changed bit and covered by the frame is located within the fourth region.

\* \* \* \* \*